Figure 5:
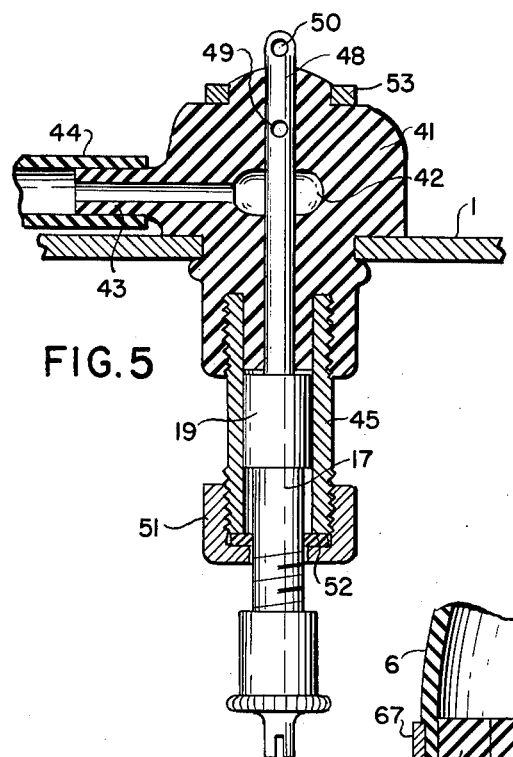

Nov. 27, 1962
F. A. HOWARD
3,065,763
ELASTOMER PLUG DUAL VALVE
Filed July 13, 1960
2 Sheets-Sheet 1
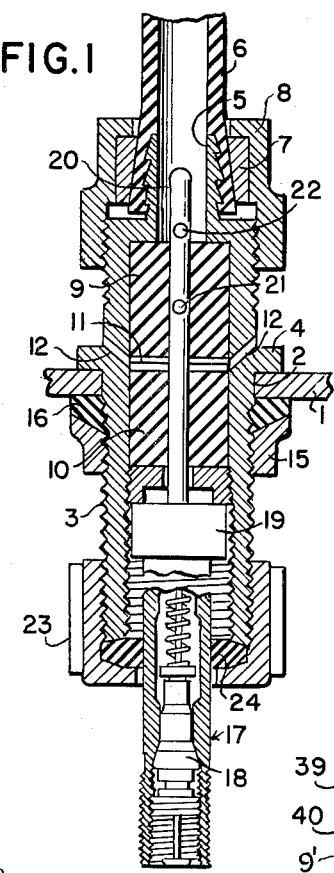
FIG.1
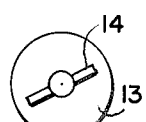
FIG.2
FIG.2a
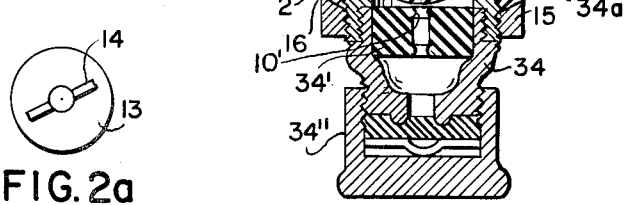
FIG.4
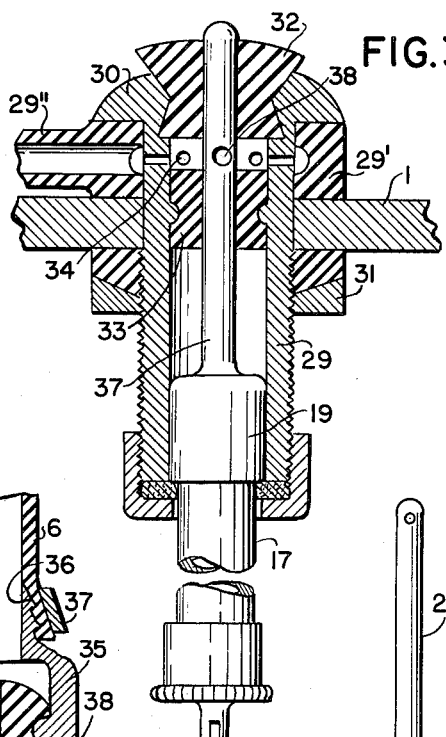
FIG.3
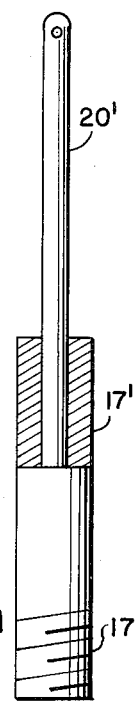
FIG.4a
INVENTOR.
Frank A. Howard
BY
Kenyon & Kenyon
ATTORNEYS Nov. 27, 1962  F. A. HOWARD  3,065,763
ELASTOMER PLUG DUAL VALVE
Filed July 13, 1960  2 Sheets-Sheet 2

INVENTOR.
Frank A. Howard
BY
Kenyon & Kenyon
ATTORNEYS

United States Patent Office 3,065,763
Patented Nov. 27, 1962

3,065,763
ELASTOMER PLUG DUAL VALVE
Frank A. Howard, 30 Rockefeller Plaza,
New York 20, N.Y.
Filed July 13, 1960, Ser. No. 42,626
12 Claims. (Cl. 137—223)

My invention relates to valves and especially to dual valves suitable for use in dual compartment tires such as those shown in my Patent No. 2,934,127 and my co-pending application No. 585,223 now Patent No. 2,969,824, dated January 31, 1961. Such valves present unusual problems of standardization and also afford opportunity for the use of novel designs not adapted for large fluid control devices. The invention will be fully understood from the following specifications taken in connection with the accompanying drawings in which FIGURE 1 is a cross section, partly in elevation, of a dual valve, FIGURE 2 is a face view of the radially corrugated washer which separates the elastomer plug seals of the valve and provides air passages through the space between these two seals, FIGURE 2a is a face view of the nut which retains and compresses the elastomer plug seals, and FIGURES 3, 4, 5, 6 and 7 are sections of modified valve constructions making use of various forms of elastomer plugs to be used in combination with hollow needle air tubes. FIGURE 4a shows a separate inflation valve and attached hollow needle for use with a dual valve of the special type shown in FIGURE 4.

Referring more particularly to FIGURE 1 of the drawings the number 1 designates a fragment of a rigid metallic rim having the usual relatively large valve opening 2 provided for present standard rubber snap-in valves. The dual valve of my invention has a straight cylindrical body portion 3 provided with an outside flange 4 and a reduced nipple 5 on the upper end, serrated externally for attachment of a tube 6. The tube 6 is fastened to the serrated nipple 5 by a tapering ring 7 which may be squeezed inward to compress the tube against the serrated nipple by a gland nut 8 threaded on to the upper end of the valve body 3.

Two elastomer plug seals 9 and 10 which form the sealing sections of the valve are mounted end-to-end within the bore of the valve body and are separated by a radially corrugated metal washer 11 which is shown in face view in FIGURE 2, the corrugations of the washer providing an air delivery zone between the plugs 9 and 10. Openings 12 through the body 3 of the valve form a communication between the air delivery zone between the plugs and the space surrounding the valve. The elastomer seals 9 and 10 are preferably of somewhat greater initial or unstressed diameter than the bore of the body 3 so that they must be radially compressed as they are forced into the valve body. To bring axial pressure upon them to push them home and also to hold them in axial compression there is provided a nut 13 having screw driver slot 14 in its face. This permits the nut to be rotated on its thread in the bore of the valve 3 to force the two plug seals 9 and 10 and the washer 11 into their final position as shown in FIGURE 1 and retain them in an axially compressed condition. Axial compression of the confined seals by the nut 13 tends to expand them radially to further perfect an air-tight joint with the bore of the valve body 3 and with the fissure which forms the hollow needle air passage later described. A permanent bond and seal between the plugs and the bore of the valve body may, if desired, be obtained by swabbing the bore with cement before inserting the plugs. The valve body 3 is adapted to be locked in the opening 2 in the rim 1 by a gland nut 15 which is run up on external threads on the body 3 and compresses a sealing ring 16 against the outside face of the rim and against the outside wall of the valve body 3 to make an air-tight seal at this point.

To cooperate with the dual valve body 3 and its enclosed plug seals 9 and 10 there is provided a standard tire inflation valve designated 17 which carries the usual internal check valve or core 18. The barrel of the inflation valve carries a collar 19 and a polished slim tube or blunted hollow needle 20 which passes through axially aligned openings in the seals 9 and 10. The original or unstressed openings are somewhat smaller in diameter than the hollow needle 20 so that when the needle is inserted the walls are compressed to perfect an air-tight seal around the wall of the needle. Also it may be desirable to mold these plug seals with internal ring corrugations as shown at 9' and 10' in FIGURE 4 to give maximum insurance against air leakage along the wall of the needle. The wall of the hollow needle is interrupted to provide air openings 21 and 22 as shown in FIGURE 1.

To complete the construction of the dual valve a gland nut 23 is provided to engage external threads on the end of the valve body 3 and to compress axially and expand radially inward an elastic ring gasket or washer 24 which thus forms a friction lock and an air seal against the body of the inflation valve 17.

The valve construction shown is intended especially for use in a dual compartment tire, examples of which are shown in my Patent 2,934,127 and my co-pending application 585,223. The rubber tube 6 is to be connected with an opening in the wall of the Omega ring in the manner, for example, of the tube 9 shown in FIGURES 1 and 2 of the said co-pending application. The complete dual valve may be assembled before mounting the tire, with the exception of the sealing gasket or ring 16, the nut 15 and the gland nut 23 and its washer 24 which are to be applied only after the dual valve body 3 has been inserted through the valve hole 2 in the rim 1, from the inside. The tube 6 may be cut to the appropriate length at the time the valve is assembled if it is to be used for field installations.

When a dual compartment tire, such as that shown in my patent and application above referred to, has been mounted on the rim it is usually desirable to inflate the inner chamber of the tire first in order to seat the beads. To accomplish this, the gland nut 23 is loosened and the inflation valve 17 is withdrawn to the limit of its motion when the collar 19 is stopped by the flange of the gland nut 23 and the washer 24. The gland nut may then be turned up tightly to lock the valve 17 in its outward position and permit an inflation hose to be applied to the upper end of the valve 17 without moving it. In this position of the parts the opening 21 in the hollow needle 20 will register with the delivery zone between the two seals formed by the corrugated washer 11. Inflation air introduced through the valve 17 in the usual way will thus be delivered into the inner tire compartment through the openings 12 and this will force the beads of the tire outwardly on the rim to their final position. When this initial tire mounting step has been completed and before inflating the inner tire compartment to its operating pressure, it is customary to inflate the outer tire compartment which may be done by loosening the gland nut 23 and pushing the inflation valve 17 inward to the limit of its motion. This will bring the opening 22 in the hollow needle outside of the seal 9, while the opening 21 will now lie in the center of the seal. Inflation or deflation of the inner and outer tire compartments may thereafter be conducted in an obvious manner.

The construction shown provides a multiple seal to prevent escape of air from either the inner or outer tire chamber. Thus escape of air through the standard inflation valve 17 is prevented not only by its inwardly-opening check valve 18 but also by the usual valve cap shown in other figures of the drawings. Escape of air through or around the plug seal 10 which is normally prevented by its tight fit within the bore of the valve body 3 and by its grip on the needle 20 is further prevented by the seal provided by the elastic washer 24 when the gland nut 23 has been set firmly in position to lock the valve 17. The gland nut 23 may be heavily knurled so that it is easily loosened and tightened by finger hold and without tools.

The compressed plug seals 9 and 10, which may be of rubber or rubber substitute in the form of various synthetic elastomers, replace all mechanical arrangements to permit a standard inflation valve, such as the valve 17, with the addition of the hollow needle 20 to its body, to function as the adjustable part of a dual tire valve, reliably preventing passage of air between the inner and outer tire chambers and at the same time providing for the customary use of the standard tire inflation valve 17 to inflate or deflate separately either of the tire chambers by adjusting its axial position, as described.

In FIGURE 3 I have illustrated a simplified construction. Here the valve body designated 29 has a flanged head 30 which may be pulled down by a nut 31 to compress and seal the thickened disk 29' which carries the air tube 29'' corresponding to air tube 6 previously described. The two plug seals are forcibly compressed into the valve body 29 and are retained therein in the positions shown by internal contractions or ribs formed in the bore of the body which register with matching contracted waist sections of the plug seals as shown, the plug in the outer open end of the valve body being designated 32, and the plug within the barrel of the valve body designated 33. The plug seals 32 and 33 are spaced apart and the valve body 29 is perforated as shown at 34 at the location of the zone between them so that air may pass through into the tube 29''. The barrel 17 of the standard tire inflation valve has a collar 19 as before, which has a sliding fit within the bore of the dual valve body 29. On the end of the collar portion 19 the inflation valve 17 carries a hollow needle here designated 37 having one or more holes 38 in its outer portion. As in the case of FIGURE 1, a gland nut which is threaded onto the dual valve 29 may be set up to compress a packing washer and also serves to limit the outward motion of the inflation valve 17 when it is adjusted axially to bring it to the position shown in FIGURE 3, so that the opening 38 in the hollow needle will register with the zone between the plugs 32 and 33. By setting up the gland nut as described in FIGURE 1, the inflation valve may be locked in this position and at the same time a second seal is formed around its barrel to trap any air which may leak through or around the plug seals. It will be clear that upon loosening the gland nut the inflation valve may be moved axially inward until it strikes the lower plug seal 33 at which point the needle opening 38 will have emerged from the upper plug seal 32 and will be able to deliver air freely into the zone above the valve.

In FIGURE 4 I have illustrated a modified form of dual valve which utilizes two spaced self-closing rubber valves having axial fissures which are normally held closed by the compressed state of the mounted valve in addition to the plug seals previously described. In this modified design the dual valve body is made in three sections, an outer section 34 which carries a plug seal 34' threaded into a middle section 34a which fits the opening 2 in the rim 1, and an inner section 35 which carries a serrated nipple 36 for attachment of the tube 6. In this case the tube 6 is shown as secured on the nipple by forcing down over it a slightly tapered ring 37. The inner body section 35 carries a second plug seal 35''.

The middle and inner body sections of the valve are fitted with self-closing rubber plug valves 38 of a well-known type provided with one or more fissures in the form of slits in the central portion as indicated at 39 and each molded with a groove 40 in the mid-section, so that when forcibly compressed through an opening in a flange in the barrel of the valve body it will expand outward to lock itself in place and form a tight joint. The compressed condition of these plug valves when they have been so mounted also serves to seal the slits 39 as is well known. After the plugs 38 have been positioned in the two sections of the valve body, the sections are assembled by a threaded joint at 39' as shown in the drawing. In this assembled position the zone between the two plugs communicates with the space around the valve section 35, as by means of drilled holes 35'. The middle valve body section is locked and sealed in the rim 1 by a gland nut 15 and washer 16 as in FIGURE 1. The outward end of the valve body section 34 may be reduced and fitted with a threaded cap and sealing washer as shown at 34'' in FIGURE 4.

To cooperate with the form of dual valve shown in FIGURE 4 I use a standard inflation valve 17 equipped with a hollow needle as shown in FIGURE 4a. To use this valve it is only necessary to remove the sealing cap 34'' from the end of the outer valve body section 34, and insert the hollow needle 20' through the central opening in the outer end of the body section 34, after which it is forced through the smaller central opening in the plug seal 34, to form a tight seal and then through the slit in the self-closing rubber valve 38 of the middle valve section. The seal provided by the outer plug 34' around the wall of the needle prevents leakage of air outward around the needle when it is pushed through the slit in the outer self-closing plug valve 38. Markings may be applied to the needle to indicate the proper insertion to be used for delivery of air into the zone opposite the valve body openings 35' and thence to the inner tire chamber through these openings 35'. In the alternative a removable sleeve 17' of the correct length may be supplied with the inflation valve, so that by slipping the sleeve over the hollow needle 20', as shown in FIGURE 4a, it may be pushed inward until stopped by the sleeve, at which point an opening at or near the end of the needle 20' will lie in the middle zone. On removal of the sleeve 17' the needle 20' may then be inserted full length, at which point its air delivery opening will be clear of the slit 39 in the inner plug 38 and air will be delivered into or out of the outer tire compartment through the tube 6.

In FIGURE 5 I have shown a simplification of construction in which the two rubber plug seals which provide the separate air delivery zones for the dual valve are formed by a single molded rubber plug designated 41 which can be pushed forcibly into the opening in the rim 1 from the inside and is then retained in position both by its own elastic outward pressure on the opening in the rim 1 into which it has been forced, and by the internal air pressure which pushes the shoulder of the rubber plug 41 against the inner face of the rim. This general construction is familiar to the tire trade under the name of "snap-in valve." Within the central portion of the special rubber snap-in plug 41 incorporating my invention, there is molded a cavity 42 which opens into the bore of a rubber nipple 43 to which there is secured a tube 44 corresponding to the tube 6 shown and described in FIGURES 1 and 4. There is molded into the outer portion of the rubber plug 41 a metal nipple 45 which serves to guide and retain the barrel of the standard tire inflation valve 17. As in the case of FIGURE 3 this tire inflation valve has an enlargement or collar 19 on its inner end and carries a hollow needle here designated 48. The hollow needle is in this case provided with air openings at two levels, one as shown at 49 some distance inward from the end of the needle, and the other as shown at 50 at or near the end of the needle. The metal nipple 45 of the dual valve body is provided with a gland nut 51 which can compress an elastic gasket or washer 52 which serves as a seal around the barrel of the standard inflation valve 46 and also serves as a stop to limit the outward travel of the inflation valve 46, all operating as described in FIGURES 1 and 3. If desired a metal ring 53 may be forced around the extreme outer end of the rubber plug 41 to hold it in compression in order to insure maintenance of a tight outer seal around the needle 48. The compression fit of the plug 41 in the rim 1 serves a similar purpose for the inner seal.

In the position which the inflation valve 17 occupies in FIGURE 5, it will be seen that the opening 49 of the hollow needle is hermetically sealed by the surrounding wall of the plug 41 while the opening 50 at the end of the needle is free to deliver air into or out from the zone or chamber surrounding the valve. By moving the inflation valve 17 axially outward to the limit of its motion, the opening 49 in the hollow needle registers with the cored cavity 42 in the center of the plug 41 while the opening 50 in the outer end of the needle is now blanked by the outer sealing portion of the plug 41. Therefore in this outward position of the inflation valve 46 air will be delivered through the hollow needle into and through the tube 44.

Figure 6:
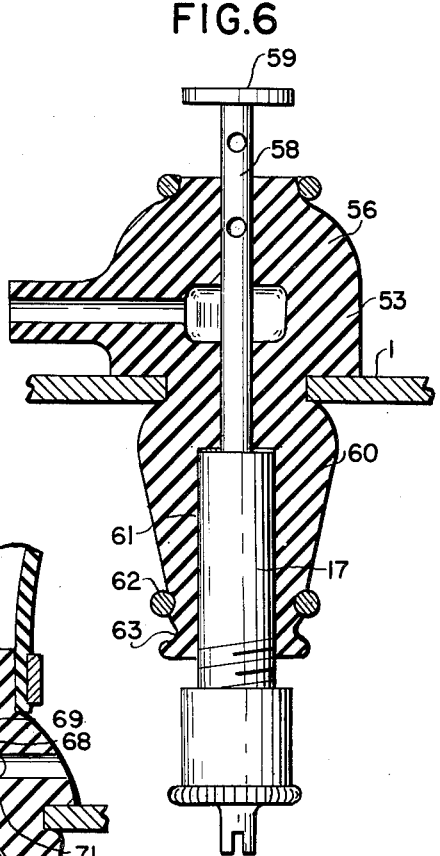

In FIGURE 6 I have shown an alternative and still further simplified design in which a snap-in rubber plug designated 53 serves both as a double plug seal and as the guide for the standard tire inflation valve 17 which carries a hollow needle 58 on its end, as previously described. In the simplified design of FIGURE 5 the outward motion of the tire inflation valve 57 within the plug is limited by providing a head 59 which is attached to the needle 58. The outer portion of the snap-in rubber plug which is designated 60 is formed with a cylindrical bore 61 which provides a sliding fit around the matching cylindrical barrel of the inflation valve 17. Inward adjustment of the inflation valve is limited by the bottom of this molded cavity in the snap-in plug while outward motion is limited, as above described, by the head 59 on the hollow needle 58. The valve 17 is normally locked in position and also hermetically sealed within the bore 61 by a ring 62 which may be forced inward by hand to seat tightly in and compress a groove around the outer portion of the rubber section 60. To loosen the valve 17 for adjustment purposes the metal ring 62 may be pulled outward to lie loosely in a smaller groove 63.

Figure 7:
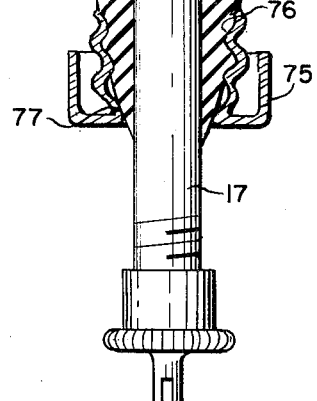

In FIGURE 7 I have shown an alternative simplified design in which there is used a rubber snap-in dual valve body designated 64. This carries on its end a boss 65, the outer end of which may be centrally slitted to form a self-closing rubber valve of the type described in FIGURE 4. Alternatively the boss 65 may take the form of a short metal nipple molded into the plug 64 and with a serrated open end as shown at 5 in FIGURE 1. A tube 6 which replaces the tubes earlier described as a means of delivering air to an outer tire chamber may be connected to this boss 65. The tube 6 may be held on the boss by a metal compression ring 67 which also serves to insure a tight fit around the hollow needle 68 when it is pushed through the slits in the end of the boss 65, and insure the closing of these slits in the center of the boss to form a separate outer seal when the needle is withdrawn to the central bore of the plug in the position shown in FIGURE 6. Protection against flow of air out of the tube 6 is also provided by the seal around the needle, as in previous forms of the invention. In this case the needle has an opening 69 at or near its end and second openings 70 which in the position of the parts shown in FIGURE 6 registers with a cavity 71 molded into the dual valve body 64 to deliver air to the inner tire chamber surrounding the valve. As in the case of the construction described in FIGURE 6 this type of rubber snap-in valve carries no metal barrel but instead the barrel of the standard tire inflation valve 17 slides directly in and out within a matching cylindrical bore in the outer end of the snap-in dual valve body. To limit outward motion of the inflation valve 17 it may carry a tapering collar 73 which slides within an enlarged inner portion of the bore of the dual valve body, the rubber body being sufficiently elastic to permit the tapering collar to be forcibly pushed through the smaller outer bore to assemble the parts. To hold the inflation valve 17 in its adjusted position, either as shown in FIGURE 6 at the outer end of its travel, or at the inner end of its travel, with the collar 73 bearing on the inner end of the enlarged bore 74 and the opening 69 delivering into the tube 6 while the openings 70 are blanked by the smooth and radially compressed portion of the bore of the plug below the slitted outer end of the boss 65, I provide a pressed sheet-metal nut 75 provided with internal threads which engage coarse molded screw threads 76 formed on the rubber dual valve body 64. The end of the dual valve body beyond the threads 76 is tapered and the nut 75 is formed with a bearing portion 77 which presses against this tapered rubber end to lock the inflation valve 72 in its adjusted position and also form an air-tight seal around the barrel of the inflation valve. To reduce friction at the rubber screw threads, the inside of the metal nut 75 may be wetted before assembly, or it may be lubricated with a film of permanent lubricant such as glycerine in the case of elastomers which are attacked by oil, or may be lubricating oil or grease in the case of elastomers not attacked by these lubricants. It is also of advantage in all modifications of my design to apply such a permanent lubricant film to the hollow needle and to the barrel of the standard inflation valve to make assembly and adjustment easier.

While I have shown and described in some detail various embodiments of my invention, it will be understood that this is only for the purpose of making the essentials of the invention more clear and I do not regard it as limited to particular details shown or described save in so far as they may be defined by the appended claims, in which it is my intention to claim all novelty inherent in the invention as far as is permissible in view of the prior art.

What I claim is:

1. A self-contained dual valve adapted to be detachably mounted as a unit in a fluid-containing wall and, including axially aligned spaced elastomer sealing sections, one arranged to separate an inner fluid delivery zone from an outer fluid delivery zone to prevent flow of fluid therebetween, and a second arranged to seal said outer zone from the outside of the valve, said elastomer sections having axial open passages therethrough, a hollow needle slidably extending through said passages and dilating the walls thereof to effect a fluid-tight seal thereagainst, and a hollow handle section secured to the end of said needle beyond the outer elastomer section of the valve to effect axial adjustment of the needle and thereby select the desired valve operation, the wall of said needle being interrupted so that at one axial position of said needle its interior communicates through an interruption in the wall thereof with the said inner zone, and at another axial position with said outer zone, said hollow handle section affording a fluid connection to said needle and additional means carried by the valve for retaining the adjustable assembly of needle and handle therein.

2. A dual valve in accordance with claim 1 in which the hollow handle section carries an internal inwardly opening check valve, whereby escape of fluid from both of said zones to the outside is prevented.

3. A dual valve in accordance with claim 1 in which the hollow handle section is of cylindrical form coaxial with the needle, wherein said additional means hermetically seals said handle section in any adjusted position.

4. A dual valve as described in claim 1 in which the two elastomer sections are molded as a single piece with a central cavity separating the two sections and having a side outlet opening.

5. A dual valve as described in claim 1 and in which the elastomer sections are molded in a single piece with a central cavity separating the two sections and having a side outlet opening and said piece is of outside contour permitting it to be forced axially into an opening of similar cross section and smaller diameter in the fluid containing wall, so as to be sealed therein by its elastic expansion.

6. A dual valve as described in claim 1 in which the two elastomer sections are molded as a single piece with a central cavity separating the two sections and having a side outlet opening and carrying an extension on its external end which surrounds the handle section, which extension is provided with movable means for locking and sealing or releasing for free axial movement within the intended limits the handle which it surrounds.

7. A dual valve as described in claim 1 in which the additional means for retaining the adjustable assembly within the valve comprises an enlargement on that portion of the assembly lying within the valve and an abutting surface is carried by the valve for limiting the outward axial movement of the assembly by contact with such enlargement.

8. A valve comprising a rigid body confining in the fluid-conducting section thereof an elastomer sealing plug forming a fluid-tight seal with the confining wall of the body and having an axially aligned open passage of relatively small diameter, an axially adjustable slim tube of relatively larger diameter and similar cross section extending through the said open passage and forcing the wall thereof outwardly so as to make a fluid-tight seal against said wall, said tube having a fluid delivery opening through its wall in the zone of the said plug, a hollow handle section for the tube extending outside of the valve body and adapted to serve both as an enlarged fluid connection for the tube and an operating handle therefor, means carried by that portion of the valve body which is to lie within any fluid-confining wall in which it is mounted and spaced from said plug to form a chamber, said valve having perforations in communication with said chamber for separately delivering fluid from zones lying on opposite ends of the elastomer plug, whereby axial adjustment of the tube permits selective delivery of fluid through the handle and tube into either of the two zones on opposite ends of the plug, the plug itself acting to prevent flow of the fluid from one zone to the other, and means carried by the body outwardly of the outer fluid delivery zone for sealing the body against the adjustable assembly of tube and handle at a plurality of axial positions of adjustment thereof.

9. A valve as described in claim 8 in which the handle section carries a separate removable valve element for independently controlling fluid flow through the tube.

10. A dual valve in accordance with claim 8 in which the elastomer plugs are of greater unstressed diameter than the body in which they are mounted so as to be compressed radially when positioned in the body, and means are provided for retaining the plugs in the body under axial compression as well, whereby maximum insurance is obtained of a continuing air-tight seal around the wall of the needle and between the plugs and the confining wall of the body.

11. A dual valve in accordance with claim 10 in which the barrel of the tire inflation valve moves axially within a matching bore of the dual valve body and adjustable means are carried by the outer end of the dual valve body for locking and sealing the inflation valve barrel thereto in its axially adjusted positions.

12. A dual valve for dual compartment pneumatic tires comprising a rigid valve body adapted to be mounted in the rim carrying the tire, spaced elastomer plugs forming fluid-tight seals with the confining walls of the valve body and having axially aligned open passages of small diameter therein, means carried by the dual valve body for separately collecting and delivering air from each of the two zones formed between the spaced plugs and beyond the inner plug, a hollow needle of similar cross section and of diameter larger than the axial passages through the plugs, said needle having an air delivery opening through its wall in the zone of the said plugs, a tire inflation valve barrel having a removable inwardly opening check valve located therein affixed to the outer end of the needle whereby inflation air may be selectively delivered thru the said check valve and needle into the zone between the spaced plugs or into the zone beyond the outer plug by axial adjustment of the needle, escape of air from the zone between the spaced plugs to the outside being prevented by the seal between the compressed wall of the passage and the wall of the needle in the outer plug through which the needle slides, and passage of air between the two delivery zones being prevented by the inner plug, while the tire inflation check valve prevents reverse flow from both zones.

References Cited in the file of this patent
UNITED STATES PATENTS

| | | |
|---|---|---|
| 2,295,457 | Eberhard | Sept. 8, 1942 |
| 2,549,075 | Fox | Apr. 17, 1951 |
| 2,933,120 | Siedow | Apr. 19, 1960 |
| 2,936,017 | McCord | May 10, 1960 |
| 2,964,084 | Tubbs | Dec. 13, 1960 |
| 2,969,824 | Howard | Jan. 31, 1961 |